US009788185B2

(12) United States Patent
Seok et al.

(10) Patent No.: US 9,788,185 B2
(45) Date of Patent: Oct. 10, 2017

(54) METHOD AND APPARATUS FOR FINDING A NEIGHBOR IN A WIRELESS COMMUNICATION SYSTEM

(75) Inventors: Yongho Seok, Anyang-si (KR); Hyangsun You, Anyang-si (KR); Jihyun Lee, Anyang-si (KR); Eunsun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 103 days.

(21) Appl. No.: 14/123,938

(22) PCT Filed: Jun. 11, 2012

(86) PCT No.: PCT/KR2012/004592
§ 371 (c)(1),
(2), (4) Date: Dec. 4, 2013

(87) PCT Pub. No.: WO2012/169855
PCT Pub. Date: Dec. 13, 2012

(65) Prior Publication Data
US 2014/0092779 A1    Apr. 3, 2014

Related U.S. Application Data

(60) Provisional application No. 61/495,347, filed on Jun. 9, 2011, provisional application No. 61/548,696, filed on (Continued)

(51) Int. Cl.
*H04W 8/00* (2009.01)
*H04L 29/12* (2006.01)
*H04W 48/16* (2009.01)

(52) U.S. Cl.
CPC ......... *H04W 8/005* (2013.01); *H04L 61/2007* (2013.01); *H04L 61/2015* (2013.01); (Continued)

(58) Field of Classification Search
USPC ........................................ 370/254
See application file for complete search history.

(56) References Cited

U.S. PATENT DOCUMENTS 8,520,583 B2 *  8/2013  Kasslin ................. H04W 48/14
                                                 370/312
2005/0144260 A1 *  6/2005  Han ................... H04L 29/12311
                                                 709/219
(Continued)

FOREIGN PATENT DOCUMENTS

EP          1912414    * 12/2008  ............. H04L 29/12
KR      2008-0012729     2/2008
(Continued)

OTHER PUBLICATIONS

PCT International Application No. PCT/KR2012/004592, Written Opinion of the International Searching Authority dated Dec. 10, 2012, 17 pages.

*Primary Examiner* — Jeffrey M Rutkowski
*Assistant Examiner* — Mehedi Aley
(74) *Attorney, Agent, or Firm* — Lee Hong Degerman Kang Waimey

(57) ABSTRACT

A device and method for performing Internet Protocol (IP) configuration by a station (STA) of a wireless communication network. The method includes: prior to associating with an access point (AP), receiving, at the STA from the AP, a beacon frame including subnet information and IP type information of the AP; transmitting, by the STA to the AP, a request frame including a requested IP address. Here, the requested IP address is determined by the STA based on the subnet information and the IP type information of the AP. The method also includes: receiving, by the STA from the AP, a response frame including information on an availability of the requested IP address; and associating with the AP by the STA based on the response frame.

15 Claims, 9 Drawing Sheets

Related U.S. Application Data on Oct. 18, 2011, provisional application No. 61/586,829, filed on Jan. 15, 2012.

(52) U.S. Cl.
CPC ...... *H04L 61/2046* (2013.01); *H04L 61/2092* (2013.01); *H04L 61/6068* (2013.01); *H04W 48/16* (2013.01); *H04L 61/6004* (2013.01); *H04L 61/6022* (2013.01); *H04L 61/6059* (2013.01)

(56) References Cited

U.S. PATENT DOCUMENTS

| | | | |
|---|---|---|---|
| 2006/0159049 A1* | 7/2006 | Chung | H04L 29/12216 370/331 |
| 2007/0076681 A1* | 4/2007 | Hong | H04L 29/12216 370/349 |
| 2008/0025253 A1* | 1/2008 | Choi | H04L 29/12264 370/328 |
| 2008/0089258 A1* | 4/2008 | Cheon | H04L 29/1232 370/310 |
| 2010/0115067 A1* | 5/2010 | Brant | H04L 29/12216 709/221 |
| 2011/0134897 A1* | 6/2011 | Montemurro | H04M 1/72536 370/338 |

FOREIGN PATENT DOCUMENTS

| | | |
|---|---|---|
| KR | 2008-0033735 | 4/2008 |
| KR | 2010-0021643 | 2/2010 |

* cited by examiner

METHOD AND APPARATUS FOR FINDING A NEIGHBOR IN A WIRELESS COMMUNICATION SYSTEM

CROSS-REFERENCE TO RELATED APPLICATIONS

This application is the National Stage filing under 35 U.S.C. 371 of International Application No. PCT/KR2012/004592, filed on Jun. 11, 2012, which claims the benefit of U.S. Provisional Application Ser. No. 61/495,347, filed on Jun. 9, 2011, 61/548,696, filed on Oct. 18, 2011, and 61/586,829, filed on Jan. 15, 2012, the contents of which are all hereby incorporated by reference herein in their entirety.

BACKGROUND OF THE INVENTION

Field of the Invention

The present invention relates to a method and apparatus for discovering a neighbor in a wireless communication system.

Description of the Related Art

Standards for Wireless Local Area Network (WLAN) technology have been developed as Institute of Electrical and Electronics Engineers (IEEE) 802.11 specifications. IEEE 802.11b may provide a maximum transfer rate of 11 Mbps, and IEEE 802.11a may provide a maximum transfer rate of 54 Mbps. IEEE 802.11g may use Orthogonal Frequency Division Multiplexing (OFDM) at 2.4 GHz, and provide a transfer rate of 54 Mbps. IEEE 802.11n may use Multiple Input Multiple Output (MIMO)-OFDM, and provide a transfer rate of 300 Mbps to four spatial streams. IEEE 802.11a and 802.11b use an unlicensed band at 2.4 GHz or 5 GHz. IEEE 802.11b provides a transmission rate of 11 Mbps and IEEE 802.11a provides a transmission rate of 54 Mbps. IEEE 802.11g applies Orthogonal Frequency-Division Multiplexing (OFDM) at 2.4 GHz to provide a transmission rate of 54 Mbps. IEEE 802.11n may use Multiple Input Multiple Output (MIMO)-OFDM, and provide a transfer rate of 300 Mbps to four spatial streams. IEEE 802.11n may support a channel bandwidth up to 40 MHz to provide a transfer rate of 600 Mbps.

IEEE 802.11ai is a standard for supporting fast initial link setup of an IEEE 802.11 station (STA). For example, technology for implementing fast initial link setup through an IEEE 802.11 Medium Access Control (MAC) layer has been developed through IEEE 802.11ai. For example, a legacy initial link setup scheme has disadvantages in that link setup of some users is largely delayed when many users simultaneously attempt to access a base station (BS) station (STA). The fast initial link setup may be necessary to solve the above problem of the legacy initial link setup scheme, or may also be used for other cases.

A legacy Internet Protocol (IP) setup process is carried out by a higher layer (e.g., an IP layer) after completion of an initial link setup process. In this case, a time for IP setup is additionally consumed after completion of initial link setup, such that it is difficulty to perform the initial link setup at high speed.

BRIEF SUMMARY OF THE INVENTION

An object of the present invention is to provide a new IP setup method to be carried out before completion of initial link setup or a new IP setup method to be carried out independently from initial link setup.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for performing Internet Protocol (IP) configuration by a station (STA) of a wireless communication network including: receiving network prefix information; configuring an IP address on the basis of the network prefix information; and transmitting a Generic initial Advertisement Service (GAS) initial request frame including the configured IP address information to an access point (AP).

In another aspect of the present invention, a method for supporting Internet Protocol (IP) configuration of a station (STA) by an access point (AP) of a wireless communication network includes: receiving a Generic Advertisement Service (GAS) initial request frame including IP address information configured by the STA, from the STA; detecting the presence of STA configured to use the same IP address as the IP address information configured by the STA; and transmitting the detected result to the STA, wherein the IP address configured by the STA is configured on the basis of network prefix information received by the STA.

In another aspect of the present invention, a device for performing Internet Protocol (IP) configuration in a wireless communication network includes: a transceiver configured to communicate with an access point (AP); a processor configured to control the device including the transceiver, wherein the processor receives network prefix information, configures an IP address on the basis of the network prefix information, and transmits a Generic initial Advertisement Service (GAS) initial request frame including the configured IP address information to the access point (AP).

In another aspect of the present invention, a device for supporting Internet Protocol (IP) configuration of a station (STA) in a wireless communication network includes: a transceiver configured to communicate with the STA; a processor configured to control the device including the transceiver, wherein the processor receives a Generic Advertisement Service (GAS) initial request frame including IP address information configured by the STA from the STA, detects the presence of STA configured to use the same IP address as the IP address information configured by the STA, and transmits the detected result to the STA through the transceiver, wherein the IP address configured by the STA is configured on the basis of network prefix information received by the STA.

The following description may be commonly applied to the embodiments of the present invention.

The method may further include: receiving a Generic initial Advertisement Service (GAS) initial response frame including the IP address information and Medium Access Control (MAC) address information from the access point (AP).

The method may further include: if the MAC address is identical to a MAC address of the STA, using the configured IP address; or if the MAC address is different from the MAC address of the STA, generating a new IP address.

The GAS initial request frame may be an Access Network Query Protocol (ANQP) request frame, and the GAS initial response frame may be an Access Network Query Protocol (ANQP) response frame.

The GAS initial request frame further may include MAC address information of the STA.

The method may further include: determining whether to configure a new IP address on the basis of the network prefix information.

The new IP address may be configured only when the network prefix information is different from a prefix of an IP address owned by the STA.

The network prefix information may be received through a beacon frame or a probe response frame.

The network prefix information may be received through an information element including a prefix value and including at least one of prefix type information and prefix length information.

The receiving, the configuring, and the requesting may be carried out before completion of initial link setup.

The detecting may include: multicasting a neighbor request frame generated on the basis of the IP address information configured by the STA to a network, and waiting for a neighbor advertisement frame.

The detecting may further include: upon receiving a neighbor advertisement frame from another STA on the network, determining detection of the STA configured to use the same IP address.

It is to be understood that both the foregoing general description and the following detailed description of the present invention are exemplary and explanatory and are intended to provide further explanation of the invention as claimed.

Advantageous Effects

As is apparent from the above description, the embodiments of the present invention can provide a new IP setup method to be carried out before completion of initial link setup or a new IP setup method to be carried out independently from the initial link setup. In addition, a time needed for either initial link setup or IP setup is greatly reduced according to the embodiments, such that additional initial link setup can be carried out at high speed.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

DETAILED DESCRIPTION OF THE INVENTION

Figure 1:
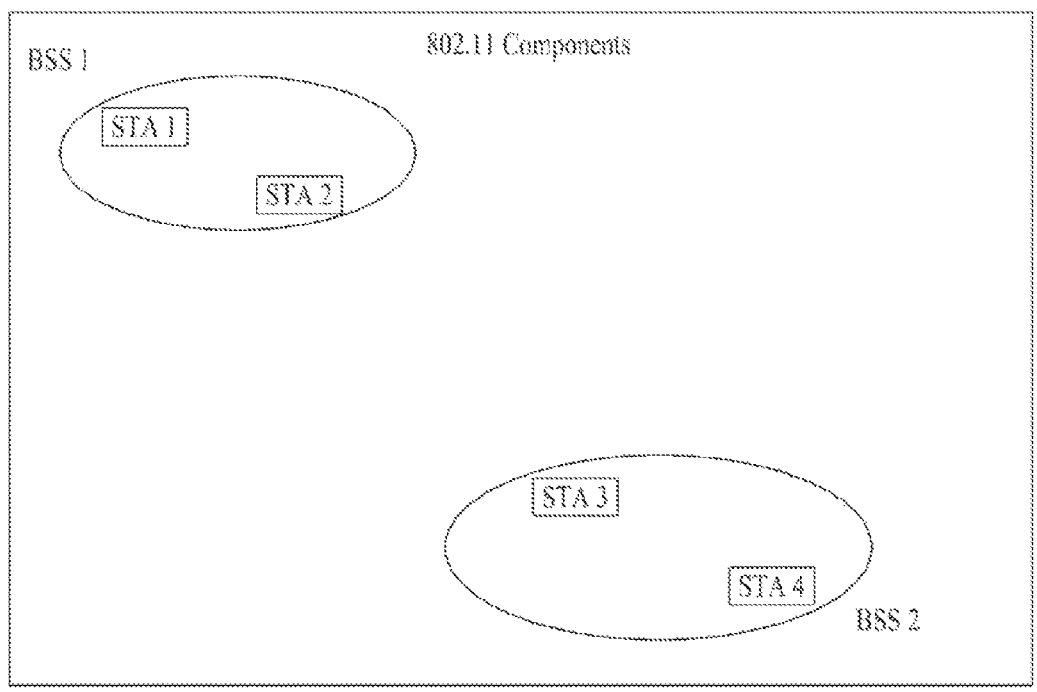
FIG. 1 exemplarily shows an IEEE 802.11 system according to one embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). For clarity, the following description focuses on IEEE 802.11 systems. However, technical features of the present invention are not limited thereto.

FIG. 1 exemplarily shows an IEEE 802.11 system according to one embodiment of the present invention.

The structure of the IEEE 802.11 system may include a plurality of components. A WLAN which supports transparent STA mobility for a higher layer may be provided by mutual operations of the components. A Basic Service Set (BSS) may correspond to a basic constituent block in an IEEE 802.11 LAN. In FIG. 1, two BSSs (BSS1 and BSS2) are shown and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in the corresponding BSS maintain communication. This area may be referred to as a Basic Service Area (BSA). If an STA moves out of the BSA, the STA cannot directly communicate with the other STAs in the corresponding BSA.

In the IEEE 802.11 LAN, the most basic type of BSS is an Independent BSS (IBSS). For example, the IBSS may have a minimum form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. Such a type of LAN is not prescheduled and may be configured when the LAN is necessary. This may be referred to as an ad-hoc network.

Memberships of an STA in the BSS may be dynamically changed when the STA is switched on or off or the STA enters or leaves the BSS region. The STA may use a synchronization process to join the BSS. To access all services of a BSS infrastructure, the STA should be associated with the BSS. Such association may be dynamically configured and may include use of a Distribution System Service (DSS).

Figure 2:
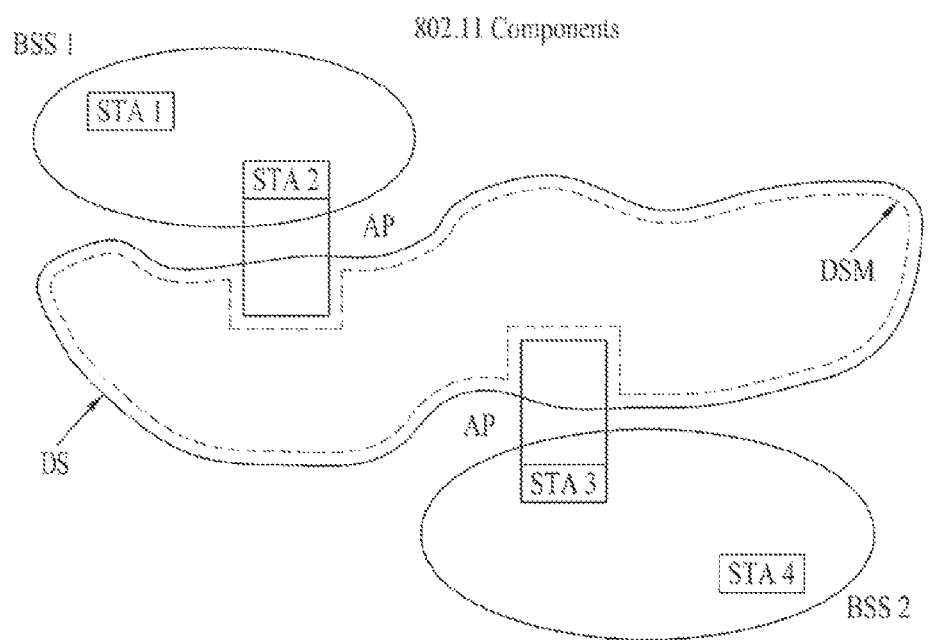
FIG. 2 exemplarily shows an IEEE 802.11 system according to another embodiment of the present invention.

FIG. 2 is a diagram showing another exemplary structure of an IEEE 802.11 system to which the present invention is applicable. In FIG. 2, components such as a Distribution System (DS), a Distribution System Medium (DSM), and an Access Point (AP) are added to the structure of FIG. 1.

A direct STA-to-STA distance in a LAN may be restricted by PHY performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a Wireless Medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data may move between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not always be identical to an address used by the AP for communication on the DSM.

Data transmitted from one of STAs associated with the AP to an STA address of the AP may always be received by an uncontrolled port and may be processed by an IEEE 802.1X port access entity. If the controlled port is authenticated, transmission data (or frame) may be transmitted to the DS.

Figure 3:
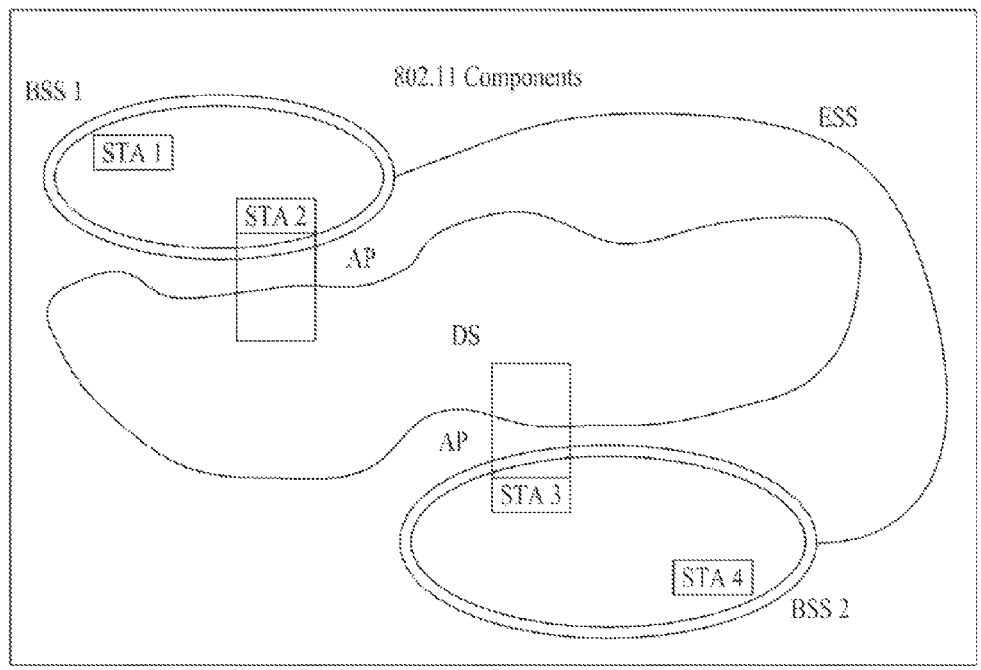
FIG. 3 exemplarily shows an IEEE 802.11 system according to still another embodiment of the present invention.

FIG. 3 is a diagram showing still another exemplary structure of an IEEE 802.11 system to which the present invention is applicable. In addition to the structure of FIG. 2, FIG. 3 conceptually shows an Extended Service Set (ESS) for providing wide coverage.

A wireless network having arbitrary size and complexity may be comprised of a DS and BSSs. In the IEEE 802.11 system, such a type of network is referred to an ESS network. The ESS may correspond to a set of BSSs connected to one DS. However, the ESS does not include the DS. The ESS network is characterized in that the ESS network appears as an IBSS network in a Logical Link Control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One or more IBSSs or ESS networks may be physically located in the same space as one or more ESS networks. This may correspond to an ESS network form in the case in which an ad-hoc network operates in a location in which an ESS network is present, the case in which IEEE 802.11 networks of different organizations physically overlap, or the case in which two or more different access and security policies are necessary in the same location.

Figure 4:
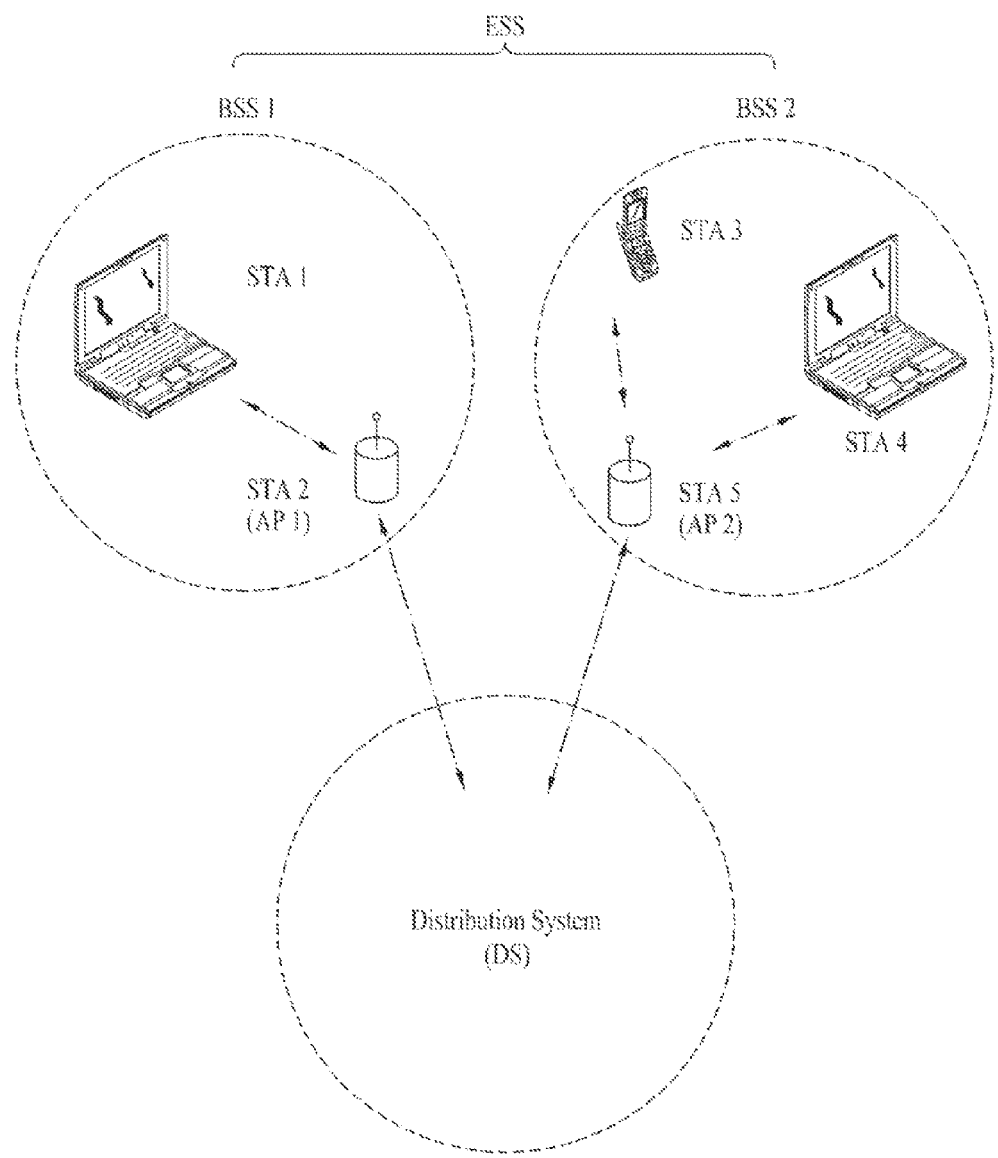
FIG. 4 is a conceptual diagram illustrating an exemplary structure of a WLAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as laptop computers or mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a Wireless Transmit/Receive Unit (WTRU), a User Equipment (UE), a Mobile Station (MS), a mobile terminal, or a Mobile Subscriber Station (MSS). The AP is a concept corresponding to a Base Station (BS), a Node-B, an evolved Node-B (e-NB), a Base Transceiver System (BTS), or a femto BS in other wireless communication fields.

Generic Advertisement Service (GAS)

In IEEE 802.11, a Generic Advertisement Service (GAS) may enable a station (STA) to discover availability of information associated with a certain network service. For example, the information associated with the network service may be an IBSS, a local access service, Subscription Service Providers (SSPs), and/or Subscription Service Provider Networks (SSPNs). Alternatively, the information associated with the network service may be information of a service provided from other external networks.

For example, it is necessary for the STA to query network service information provided from an external network located in the range exceeding the AP, before the corresponding external network is associated with a WLAN, the GAS may be used. In addition, an IBSS GAS function may enable the STA to access information associated with the service provided by other STAs contained in the corresponding IBSS.

On the contrary, Access Network Query Protocol (ANQP) is a query protocol for searching for access network information transmitted by a GAS public action frame.

Neighbor Discovery Protocol (NDP) in IPv6

A Neighbor Discovery Protocol (NDP) is one of IP suites used along with Internet Protocol version 6 (IPv6). NDP may operate in an Internet layer (or IP layer) of the Internet model. NDP may manage the following operations: i.e., address auto-configuration of a node, discovery of another node on link, decision of link layer addresses of other nodes, duplicate address detection, detection of an available router and Domain Name System (DNS) server, address prefix discovery, and retention of reachability information regarding a path toward other active neighbor nodes.

In order to perform IPv6 functions similar to (or corresponding to) (improved) address resolution protocol (ARP), ICMP router discovery, and router redirect protocol of IPv4, NDP may define five Internet Control Message Protocol version 6 (ICMPv6) packet types.

Router advertisement (RA) message is originated by routers. The RA message may be used to advertise the presence of routers and link-specific parameters (e.g., link prefix, link Maximum Transmit Unit, hop limits, etc.). Such messages may be periodically transmitted, and may be transmitted in response to a router solicitation (RS) message.

The router solicitation (RS) message may be originated by hosts, and may be used for requesting the router configured to transmit the RA message.

A neighbor solicitation (NS) message is originated by nodes, and may be used for requesting a link layer address of another node. In addition, the NS message may also be used for some functions such as duplicate address detection and neighbor reach-impossibility detection.

A neighbor advertisement (NA) message may be transmitted in response to the neighbor solicitation (NS) message. If the node changes a link-layer address, an unsolicited NA message may also be transmitted to advertise a new address.

A redirect message may be used to update a data transmission path. For example, when the host attempts to transmit data through a router R1 and the router R1 transmits the corresponding data to another router R2, a direct path from a host to the router R2 is made available, the router R1 transmits the redirect message to the host, such that it can be recognized that the best path for a destination is obtained through the router R2. A detailed description of the NDP is contained in this specification by referring to RFC 2461 documents.

On the contrary, assuming that an IPv6 host is initially activated on a link, the IPv6 host may self-configure an interface address thereof. For this purpose, a first step is used to determine a 64-bit interface ID part of the address. A mechanism referred to as MAC-to-EUI64 conversion is used on a broadcast interface. This mechanism is globally unique, and may convert a general MAC address of 48 bits to an interface ID of 64 bits. Reserved 16-bit value (0xFFFE) is inserted into an intermediate part of the MAC address, and universal/local (U/L) bit of the MAC address may be flipped to the bit of 1.

Table 1 exemplarily shows the aforementioned MAC-to-EUI64 conversion.

TABLE 1

TABLE 1-continued

U/L Bit Flipped:
00000010 00000000 00001011 11111111 11111110 00001010 00101101 01010001

↑
|

U/L Bit

Resulting EUI64 Interface ID:
0200:0BFF:FE0A:2D51

Conversion of the exemplary MAC address (0000:0B0A:2D51) will hereinafter be described with reference to Table 1. A second row of Table 1 represents a binary MAC address. A third row of Table 1 divides the MAC address into two 24-bit lengths, and s '0xFFFE' (binary number: 11111111 11111110) is inserted into the center part of the MAC address of the third row. Therefore, the address is 64 bits long. In a fourth row of Table 1, a U/L bit (i.e., $7^{th}$ bit) of an original MAC address is flipped from 0 to 1. The resultant address (0200:0BFF:FE0A:2D51) may be a 64-bit interface ID.

On the contrary, if the host only needs to communicate with devices on the link, the host can sufficiently perform auto-configuration of a link-local address thereof. However, if the host needs to communicate with off-link devices, it requires an address (generally, IPv6 address) available in a wider range. In order to acquire the above address by the host, two schemes (i.e., a stateful address auto-configuration scheme and a stateless address auto-configuration scheme) may be used.

If the host uses the stateful address auto-configuration, the host asks a Dynamic Host Configuration Protocol version 6 (DHCPv6) server for necessary address information, such that the host can obtain the necessary address information. The host may be preconfigured to search for the DHCPv6 server, or information indicating the DHCPv6 server to be used may be transferred to the host through an M flag of the received RA message. A detailed description of DHCPv6 may refer to RFC 3315 documents, and DHCPv6 is not much different from a DHCP for IPv4 in terms of end results.

The stateless auto-configuration will hereinafter be described. Accordingly, the host may acquire one or more link prefixes through the received RA messages. The host adds the acquired prefix to a previously determined interface ID, such that it can acquire a globally unique IPv6 address. For example, if the host receives the RA message advertising a prefix of (3FFE: 1104:404:1::/64) as can be seen from Table 1, the host adds the received prefix to its own interface ID (0200:0BFF:FE0A:2D51 shown in Table 1), such that it can acquire an address of (3FFE:1104: 404:1:0200:0BFF:FE0A:2D51).

Although the interface ID derived from the MAC address almost always guarantees a unique address of any scope, the operation for confirming whether the corresponding address is definitely unique is of importance. Accordingly, if the device acquires a unicast address, the corresponding device needs to perform Duplicate Address Detection (DAD) before using the corresponding address. DAD may be carried out, irrespective of whether the corresponding address was acquired according to the stateful or stateless configuration, or irrespective of whether the corresponding address was statically configured. Only one exception is considered an anycast address, because anycast addresses can be carried out for one or more devices according to definition of the addresses. In addition, the following assumption may also be used. In more detail, DAD is performed on a link-local address having an interface ID derived from MAC-to-EUI64 conversion. In addition, if the corresponding address passes, this means that other addresses having the same interface ID will also be unique and so the DAD need not be repeated.

A node having acquired a new address may classify the corresponding address as tentative. That is, the acquired new address cannot be used until the DAD operation has been completed with verification indicating that no other node on the link uses the corresponding address. The node may transmit an NS message with the target address field to the address to be verified. The source address of the NS is an unspecified address, and a destination of the NS message is a solicited-node multicast address.

The solicited-node multicast address may be formed by adding (or prepending) the prefix (FF02:0:0:0:0:1: FF00::/104) to the last 24 bits of the target address. For example, assuming an interface ID derived from the example of Table 1, the solicited-node multicast address may be denoted by FF02::1:FF0A:2D51. If the node performs auto-configuration of one or more interface addresses, the last 24 bits of addresses of the corresponding node are identical to each other, so that the solicited-node multicast address can be denoted by FF02::1:FF0A:2D51. Therefore, one NS message having the solicited-node multicast address is matched with all interface addresses of the corresponding node. In the case of using the solicited-node multicast address, when two nodes attempt to perform DAD for the same address, the two nodes can detect each other.

If the node receives the NS message and a target address is matched with one of the allocated addresses, the node transmits the NA message having the corresponding target address and the destination address may be set to a tentative address. If the node having transmitted the NS message receives the NA message, this means that tentative addresses are duplicate so that the it is impossible to use the tentative addresses.

Initial Link Setup and NDP

Initial link setup includes network discovery, authentication, association, Robust Security Network (RSN) authentication. Generally, the IP configuration process is achieved after completion of the initial link setup.

In association with the IP configuration, IPv6 may support the IP configuration scheme such as plug-and-play scheme through the stateless auto-configuration. In case of the stateless auto-configuration, after IP address configuration is not achieved through a DHCP server and the STA configures an IPv6 link local address thereof, the stateless auto-configuration scheme confirms whether the IPv6 link local address is duplicate within the same subnet (through the DAD process), and then uses the corresponding address.

A method for starting initial link setup during the initial link setup process and at the same time performing the DAD process through a neighbor discovery protocol (NDP) in parallel will hereinafter be described in detail. As described above, the conventional IP configuration process is carried out by a higher layer (e.g., IP layer) after completion of the initial link setup. However, the present invention proposes a new IP configuration method performed before the initial link setup or a new IP configuration method performed by a lower layer (e.g., MAC layer) independently from the initial link setup. According to the embodiments of the present invention, link setup overhead consumed for the legacy neighbor discovery (especially, DAD) process may be reduced. That is, the DAD process requires a standby time (e.g., 30 seconds) for waiting a response message after data has been broadcast to a specific address. An additional time (e.g., 30 seconds) consumed when DAD is carried out after completion of the initial link setup may be shortened or removed because the initial link setup and the DAD are performed simultaneously or in parallel.

For this purpose, the GAS protocol may be used in such a manner that the STA can discover a neighbor before completion of the initial link setup or can discover the neighbor independently from the initial link setup. For example, the GAS protocol may be used when the STA requests neighbor discovery from the AP and acquires neighbor information. As described above, in the case of using the GAS protocol, the STA can acquire information associated with the network connected to the corresponding AP before completion of link setup with the AP, and may be properly used when neighbor discovery is performed in the beginning process of the initial link setup. In addition, the STA supporting the GAS protocol may include an interworking element in a beacon frame, a probe response frame, or a unsolicited transmission frame, such that the STA may transmit the included result. In addition, an advertisement protocol ID supported by the STA may be transmitted through an advertisement protocol element.

Figure 5:
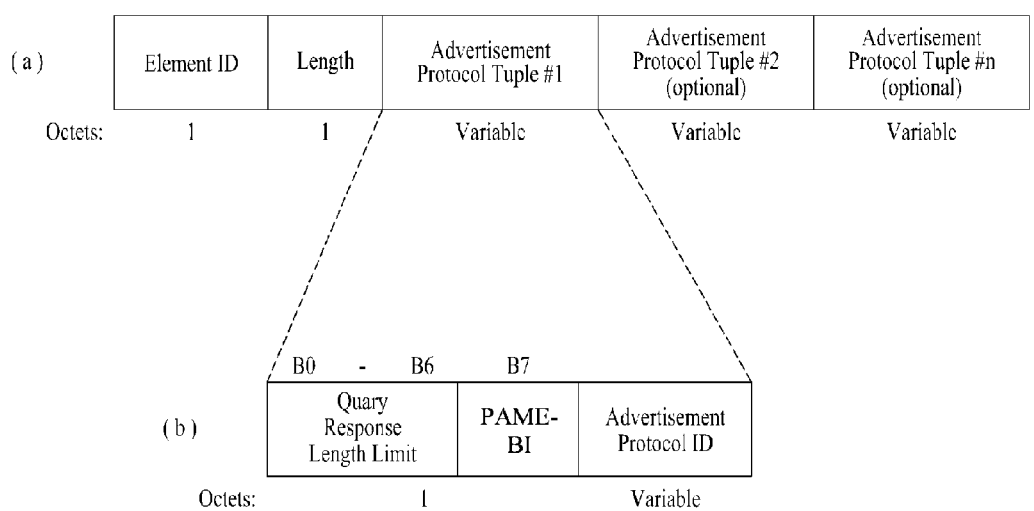
FIG. 5 is a conceptual diagram illustrating an exemplary format of an advertisement protocol information element.

FIG. 5 is a conceptual diagram illustrating an exemplary format of an advertisement protocol information element. The advertisement protocol information element may be transmitted through a beacon frame, a probe response frame, etc.

Referring to FIG. 5(a), the advertisement protocol information element may include an element ID field, a length field, and one or more advertisement protocol tuples. The element ID field may include a specific value for identifying that the corresponding element format relates to advertisement protocol information. The length field may include a specific value indicating a total length of subsequent field(s).

Referring to FIG. 5(b), a single advertisement protocol tuple field may include a Query Response Length Limit field, a Pre-Association Message Exchange BSSID Independent (PAME-BI) field, and an advertisement protocol ID field. The Query Response Length Limit field may include a specific value indicating a maximum length of a query response. The PAME-BI field may be used by the AP such that it can indicate whether an advertisement server, serving as a peer of a non-AP STA, in association with the corresponding advertisement protocol will return a BSSID used for GAS frame exchange and an independent query response. The advertisement protocol ID field may represent an advertisement protocol supported by the STA.

The following Table 2 shows exemplary ID values of the advertisement protocol.

TABLE 2

| Nme | Value |
| --- | --- |
| Access Network Query Protocol | 0 |
| MIH Information Service | 1 |
| MIH Command and Event Service Capability Discovery | 2 |
| Emergency Alert System (EAS) | 3 |
| Location-to-Service Translation Protocol | 4 |
| Reserved | 5-220 |
| Vendor Specific | 221 |
| Reserved | 222-255 |

As can be seen from Table 2, if the advertisement protocol ID is set to zero '0', this means that the AP is supported by Access Network Query Protocol (ANQP).

As shown in the example of FIG. 5, the STA may transmit the advertisement protocol information element format including the ANQP query request through a beacon frame, a probe response frame, etc. The AP having received the ANQP query request from the STA may transmit a query to a server of an external network, such that it can perform a proxy function. Alternatively, when using local information contained in the AP, neighbor information may be transmitted to the STA through the ANQP response.

In order to allow the STA to acquire neighbor information from the AP, a GAS Initial Request Frame including the advertisement protocol element shown in FIG. 5 may be transmitted.

The following Table 3 shows examples of the GAS initial request frame.

TABLE 3

| Order | Information |
| --- | --- |
| 1 | Category |
| 2 | Action |
| 3 | Dialog Token |
| 4 | Advertisement Protocol element |
| 5 | Query Request Length |
| 6 | Query Request |

As can be seen from Table 3, the GAS initial request frame may include a Category field, an Action field, a Dialog Token field, an Advertisement Protocol Element field, a Query Request Length field, and a Query Request Field.

The Category field may indicate a category (e.g., spectrum management, Quality of Service (QoS), etc.) of the corresponding frame. In this example, the category field may be set to a specific value indicating a public action frame.

The Action field may indicate which one of operations is associated with the corresponding frame. In this example, the action field may be set to a specific value (e.g., 10) of the GAS initial request frame. The dialog token field may match the action response with the action request, and at the same time may be used for the case in which there are several action requests. The dialog token field may include a specific value established by the request STA.

The advertisement protocol element field may represent an ANQP as shown in the examples shown in FIG. 5 and Table 2. For this purpose, the advertisement protocol ID field of the advertisement protocol tuple field (See FIG. 5(b)) contained in the GAS initial request frame may have a value of zero '0' indicating the ANQP as shown in Table 2.

The query request length field may be set to a specific value indicating a total length of the query request field.

The query request field is a generic container, and may be set to a specific value corresponding to a protocol format specified by the advertisement protocol element field. As can be seen from this example, if the advertisement protocol element field indicates the ANQP, the query request field may include the ANQP element.

Figure 6:
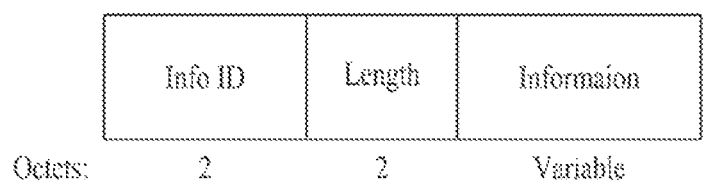
FIG. 6 is a conceptual diagram illustrating an exemplary format of an Access Network Query Protocol (ANQP) element.

FIG. 6 is a conceptual diagram illustrating an exemplary format of an Access Network Query Protocol (ANQP) element. Referring to FIG. 6, the ANQP element may include an information ID (Info ID) field, a length field, and an information field. The ANQP element may be classified according to various titles, for example, a query list, a capability list, a network authentication type, and IP address type availability. An identifier (ID) having the length of 2 octets is allocated to identify each ANQP element, and this ID may be assigned a value of the information ID. The length field may indicate the length of a subsequent field. The information field may include sub-field(s) of the ANQP element.

On the contrary, the AP having received the GAS initial request frame from the STA may generate a response message using the GAS initial response frame. The following Table 4 shows exemplary formats of the GAS initial response frame.

TABLE 4

| Order | Information |
| --- | --- |
| 1 | Category |
| 2 | Action |
| 3 | Dialog Token |
| 4 | Status Code |
| 5 | GAS Comeback Delay |
| 6 | Advertisement Protocol element |
| 7 | Query Response Length |
| 8 | Query Response (optional) |

The category field, the action field, and the dialog token field of the GAS initial response frame may have functions similar to those of the corresponding fields of the GAS initial request frame of Table 3, and may be assigned proper values in association with the GAS initial response frame. A status code field, a GAS comeback delay field, an advertisement protocol element field, a query response length field, and a query response field of the GAS initial response frame will hereinafter be described in detail.

The status code field may indicate a success or failure state. If the status code field indicates the failure status, a specific value indicating a cause of the failure may be set to the status code field.

The GAS comeback delay field may be set to a specific value indicating a delay time.

The advertisement protocol element field may represent the ANQP as described in the above-mentioned example. For this purpose, the advertisement protocol ID field of the advertisement protocol tuple (See FIG. 5(*b*)) field contained in the advertisement protocol element field of the GAS initial response frame may be set to zero '0' indicating the ANQP as described in Table 2.

The query response length field may be set to a specific value indicating a total length of the query response field.

The query request field is a generic container, and may be set to a specific value corresponding to a protocol format specified by the advertisement protocol element field. As can be seen from this example, if the advertisement protocol element field indicates the ANQP, the query request field may include the ANQP element.

Figure 7:
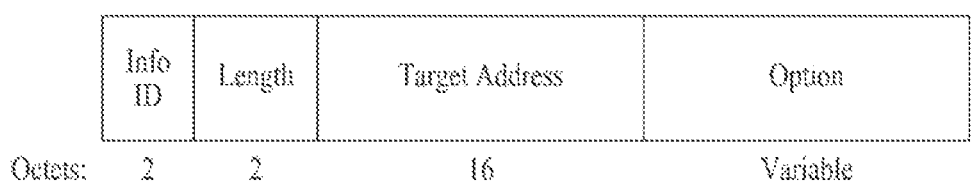
FIG. 7 is a conceptual diagram illustrating an exemplary format of a neighbor discovery information element.

If the query response corresponds to neighbor discovery information, neighbor discovery information shown in FIG. 7 may construct the ANQP element. For example, the sub field of the information field of the ANQP element shown in FIG. 6 may include a Target Address field and an Option field as shown in FIG. 7. The target address field may include a target address associated with the neighbor discovery action. The option field may include additional information.

In accordance with the present invention, the neighbor discovery process may be carried out using the above-mentioned GAS protocol (e.g., ANQP). The IP configuration operation, which is carried out before completion of initial link setup or includes neighbor discovery to be carried out independently from the initial link setup, will hereinafter be described with reference to the attached drawings.

Embodiment 1

While a general IP configuration process is carried out upon completion of initial link setup, the IP configuration operation may be carried out before completion of the initial link setup or may be carried out using the GAS protocol independently from the initial link setup as described in the examples of the present invention, such that the link setup process and the IP configuration process may be carried out in parallel. During this IP configuration, the STA may first perform the IPv6 prefix acquisition operation.

The STA adds the prefix to the interface ID thereof so as to construct the IPv6 address. In other words, the STA must recognize the IPv6 prefix information constructing the subnet so as to construct the IPv6 link local address. Such prefix information may be contained in a router advertisement information element, such that the resultant router advertisement information element may be transferred to the STAs through a beacon frame, a probe response frame, etc.

Figure 8:
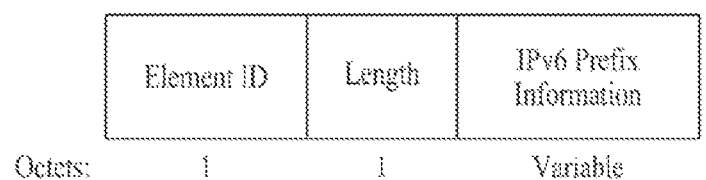
FIG. 8 is a conceptual diagram illustrating an exemplary format of a router advertisement (RA) information element.

FIG. 8 is a conceptual diagram illustrating an exemplary format of a router advertisement (RA) information element. Referring to FIG. 8, the router advertisement information element format may include an ID field, a length field, and an information field. In this case, the information field may include IPv6 prefix information constructing the subnet.

The STA having received the router advertisement information element may acquire prefix information, and may generate the IPv6 link local address using the acquired prefix information. Thereafter, the DAD process of the generated IPv6 link local address generated may be carried out by the STA.

For this purpose, the STA may transmit the ANQP request frame including the neighbor information field to the AP using the unicast scheme or the broadcast scheme. The ANQP element field contained in the ANQP request frame may be comprised of the neighbor information field, and the neighbor information field may include the target address field and the option field (See FIG. 7).

The target address field of the ANQP request frame may include an IPv6 address indicating a requested object (i.e., a target). In more detail, the target address may correspond to an IPv6 link local address generated by the STA (i.e., STA configured to transmit the ANQP request frame) using prefix information, and may be an IPv6 address indicating an object of the DAD.

The option field of the ANQP request frame may include a Medium Access Control (MAC) address serving as a requested target. In more detail, the MAC address contained in the option field may correspond to a MAC address of the STA configured to transmit the ANQP request frame.

On the contrary, the AP having received the ANQP request frame may determine the presence or absence of the STA configured to use the same address as the target address in the corresponding subnet, and may transmit the determined result to the STA having transmitted the ANQP request frame through the ANQP response frame. A method for allowing the AP to perform the DAD process in association with a target address requested by the STA will hereinafter be described in detail.

The AP may operate as a proxy of the STA (i.e., STA having transmitted the ANQP request frame), may substitute for the ICMPv6 neighbor solicitation (NS) frame, and may broadcast the constructed frame to the subnet. If the STA configured to use the same address as the corresponding IPv6 address is present, the AP may receive a response through the ICMPv6 neighbor advertisement (NA) frame. If the AP detects the STA that uses the same target address as the AP (i.e., if the AP receives an NA response from the STA configured to use the duplicate address), the AP may inform the STA (i.e., STA having transmitted the ANQP request frame) of the detected result through the ANQP response frame. In this case, the ANQP element field contained in the ANQP response frame may be comprised of the neighbor information field, and the neighbor information field may include the target address field and the option field (See FIG. 7). If the duplicate STA is present, the target address field of the ANQP response frame may include an IPv6 address indicating a neighbor discovery target (which is requested by the STA having transmitted the ANQP request frame). In the case of DAD, the same value as a target address contained in the ANQP request frame may be contained in the ANQP response frame. The option field of the ANQP response frame in the case in which the duplicate STA is present may include a MAC address of the STA configured to use the corresponding target address.

On the contrary, after the AP transmits the ICMPv6 neighbor solicitation (NS) frame requesting neighbor discovery, if the AP does not receive a certain ICMPv6 neighbor advertisement (NA) frame from STAs contained in the subnet, it is assumed that the STAs configured to use the target address in a duplicate manner are not present. In this case, the AP may inform the STA (i.e., STA having transmitted the ANQP request frame) of the above-mentioned fact through the ANQP response frame. The ANQP element field contained in the ANQP response frame may be comprised of the neighbor information field, and the neighbor information field may include the target address field and the option field (See FIG. 7).

The target address field of the ANQP response frame in the case in which the duplicate STA is not present may include an IPv6 address serving as a neighbor discovery target requested by the STA (i.e., STA having transmitted the ANQP request frame). In the case of DAD, the same value as a target address contained in the ANQP request frame may be contained in the ANQP response frame.

The option field of the ANQP response frame in the case in which the duplicate STA is not present may include a MAC address of the STA (i.e., STA having transmitted the ANQP request frame) having requested neighbor discovery of the target address.

In conclusion, if the STA receives the ANQP response frame, the STA may determine whether a duplicate-used STA is present on the subnet in relation to a target address requested by the STA on the basis of a MAC address contained in the option field.

If the MAC address of the option field of the ANQP response frame is identical to the MAC address of the STA, the STA which generates the IPv6 address to transmit the ANQP request frame can continuously use the IPv6 link local address, and the DAD process is completed.

Alternatively, if the MAC address of the option field of the ANQP response frame is different from the MAC address of the STA, the STA, which is configured to generate the IPv6 address and transmit the ANQP request frame, may generate a new IPv6 link local address instead of the IPv6 link local address. In addition, the above-mentioned neighbor discovery operation may also be carried for the newly generated IPv6 link local address.

Embodiment 2

After the STA completes the link setup operation and the IP configuration within a certain ESS, if the STA moves to a new AP contained in another ESS, the initial link setup (i.e., neighbor discovery, authentication, association, RSN authentication) needs to be newly carried out. On the contrary, information as to whether the STA will perform new IP configuration may be determined according to whether the legacy AP and the new AP pertain to the same subnet. In more detail, if the legacy AP and the new AP pertain to the same subnet, this means that the legacy IP address may be continuously valid. However, if the legacy AP and the new AP pertain to the different subnets, the IP configuration process needs to be newly carried out.

While a general IP configuration process is carried out upon completion of initial link setup, the IP configuration operation may be carried out before completion of the initial link setup or may be carried out using the GAS protocol independently from the initial link setup as described in the examples of the present invention, such that the link setup process and the IP configuration process may be carried out in parallel. Therefore, information as to whether the IP configuration process should be performed may be determined by the following process to be performed independently from the initial link setup after the STA moves to a new AP.

After the STA moves to a new AP, the STA may acquire the IPv6 prefix value (i.e., IPv6 prefix of a new subnet) contained in the router advertisement information element from a new AP through a beacon frame, a probe response frame, etc.

If the IPv6 prefix value is identical to the prefix value of an IP address currently used by the STA, the STA need not construct a new IPv6 local address and may not transmit the ANQP request frame for DAD.

On the contrary, if the IPv6 prefix value is different from a prefix value of the IP address currently used by the STA, the STA may construct the IPv6 link local address using newly acquired prefix information, and may transmit the ANQP request frame to a new AP in order to perform the DAD process.

The ANQP request may include neighbor discovery information (i.e., the target address field and the option field) of FIG. 7. Therefore, the neighbor discovery operation of FIG. 7, except for that the neighbor discovery operation is carried out through a new AP of the STA, may be equally applied to details described in the aforementioned embodiment 1.

Embodiment 3

A third embodiment (Embodiment 3) will disclose an extended application example of the scheme for determining whether the IP configuration operation will be newly carried out using prefix information received through a beacon frame, a probe response frame, etc. In more detail, the IP configuration operation may be carried out before completion of initial link setup or independently from the initial link setup. Embodiment 3 proposes a method for determining whether the IP configuration operation is needed on the basis of network prefix information. In addition, the method for determining whether the IP configuration operation is needed on the basis of network prefix information is not applied only to the IPv6 stateless auto-configuration, and may also be applied to IPv4 address configuration.

The prefix information may indicate a subnet address (or network address), and may have different formats according to the IP configuration scheme (e.g., IPv4 or IPv6). Accordingly, examples applicable to various IP configuration schemes will hereinafter be described in detail.

For example, in the case of IPv4 defining a DHCP, the IPv4 prefix element may be defined as an information element transmitted through the beacon frame, the probe response frame, etc. For example, the IPv4 prefix may have the same value as 233.1.8.x/24. In this example, the subnet mask 24 may represent the leftmost 24 bits (meanwhile, 64 bits in case of IPv6).

Accordingly, the STA may acquire the IPv4 prefix value upon receiving the beacon frame, the probe response frame, etc. from the AP (or a new AP when the STA moves to another place).

If the acquire IPv4 prefix value is different from a prefix value of a current IP address (i.e., IPv4 address) of the STA, the STA may perform the IP configuration operation. For example, DHCP 4-way handshaking started when the STA transmits a DHCP discovery message to the selected server and the non-selected server may be applied to the IP configuration operation.

If the acquired IPv4 prefix value is identical to a current IP address (i.e., IPv4 address) of the STA, the STA may not perform the IP configuration operation and may continuously use the legacy IP address.

On the contrary, in the case of the IPv4 address, according to the aforementioned embodiment 2, the STA may determine whether to perform the IP configuration operation started with transmission of the ANQP request frame according to specific information indicating whether a prefix value obtained from the network is identical to a prefix value of the IP address of the STA.

Figure 9:
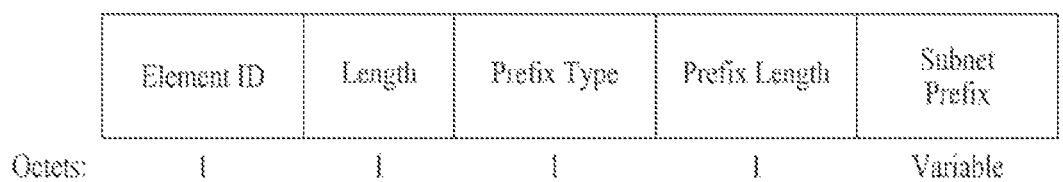
FIG. 9 is a conceptual diagram illustrating an exemplary format of a subnet prefix information element.

For this purpose, a common subnet prefix information element format including IPv4 prefix information and IPv5 prefix information needs to be defined. FIG. 9 is a conceptual diagram illustrating an exemplary format of a subnet prefix information element. Referring to FIG. 9, the subnet prefix information element may include an element ID field, a length field, a prefix type field, a prefix length field, and a subnet prefix field.

The element ID field may be set to a specific value indicating that the corresponding information element is the subnet prefix information element. The length field may be set to a specific value indicating a total length of subsequent fields.

The prefix type field may represent whether the subnet prefix contained in the subnet prefix information element relates to IPv4 or IPv6. For example, the prefix type field may be set to a specific value indicating IPv4 when the AP is coupled to the IPv4 subnet, or may be set to a specific value indicating IPv6 when the AP is coupled to the IPv6 subnet.

The prefix length field may represent the length of bits of the subnet prefix. For example, if the IPv4 prefix is denoted by 233.1.8.x/24, the subnet prefix is 24 bits long, the prefix length field is set to 24. For example, if the IPv6 prefix is denoted by 3FFE: 1104:404:1::/64, the subnet prefix is 64 bit longs, such that the prefix length field may be set to 64.

The subnet prefix field may include prefix information (i.e., a prefix value) of the subnet coupled to the AP. For example, if the IPv4 prefix is denoted by 233.1.8.x/24, the subnet prefix value may be set to '11101001 00000001 00001000'. Alternatively, if the IPv6 prefix is denoted by 3FFE: 1104:404:1::/64, the subnet prefix value may be set to '00111111 11111110 00010001 00000100 00000100 00000100 00000000 00000001'.

Figure 10:
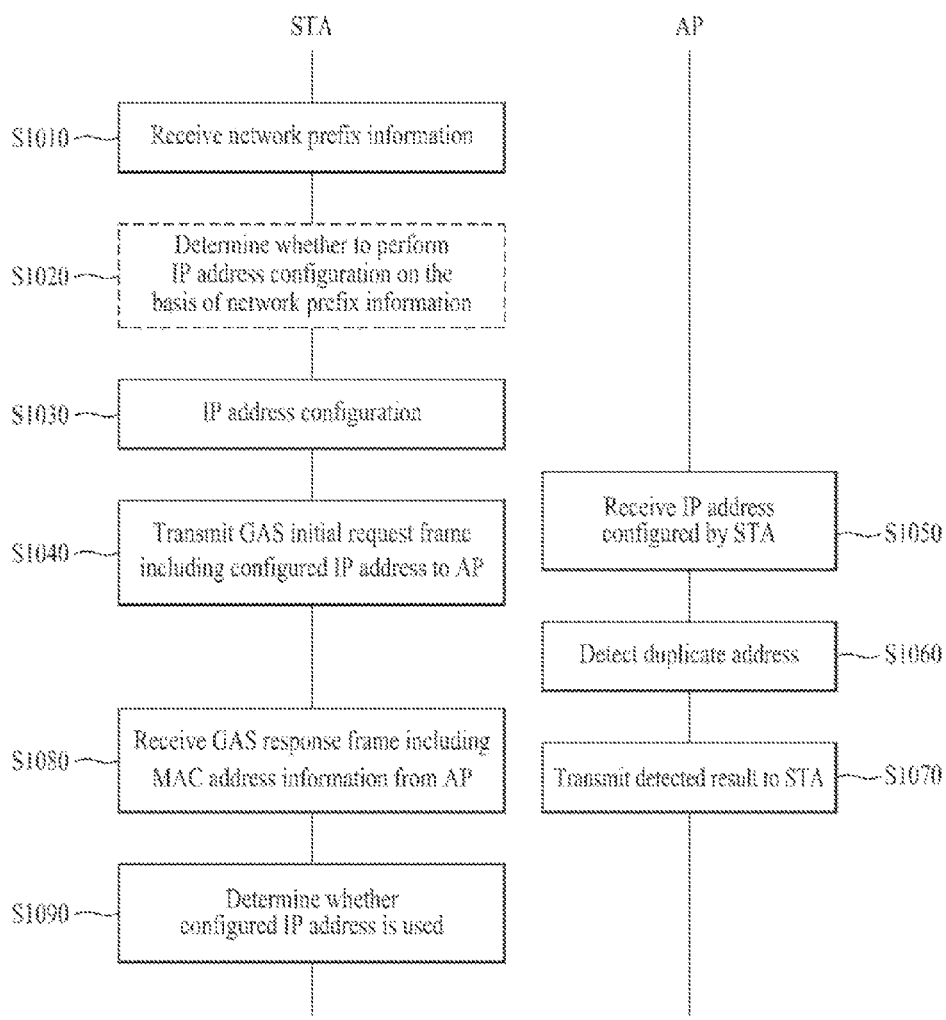
FIG. 10 is a flowchart illustrating an IP setup method according to one embodiment of the present invention.

FIG. 10 is a flowchart illustrating a method for performing IP configuration before completion of initial link setup according to one embodiment of the present invention.

In step S1010, the STA may receive the network prefix. The network prefix may be at least one of the IPv6 subnet prefix and the IPv6 subnet prefix, and may be received either through a beacon frame including the router advertisement information element or the prefix information element (See FIG. 9) or through the probe response frame, etc.

In step S1020, the STA may determine whether a new IP address configuration is needed on the basis of the network prefix. For example, the new IP address configuration can be carried out only when the network prefix is different from the prefix of an IP address of the STA. In addition, in the case in which the STA does not include the IP address, the step S1020 may be omitted. Alternatively, the step S1020 may be omitted in various other cases.

In step S1030, the STA may perform IP address configuration. For example, in the case of IPv6, the stateless auto-configuration may be carried out using the network prefix. Alternatively, in the case of IPv4, a DHCP handshaking process for IP allocation may be carried out.

The STA may transmit a GAS initial request frame including the configured IP address to the AP in step S1040, and the AP may receive the GAS initial request frame in step S1050.

In step S1060, the AP may determine whether the IP configured by the STA is a duplicate address in the network. For example, in the case of the IPv6 address, the AP may transmit the ICMPv6 NS frame and may detect a duplicate address through the DAD process in which the AP waits for a response. If the AP does not receive a response from the STA in the network, it may be determined that the corresponding IP address is not duplicate. If the AP receives a response from the STA, it may be determined that the corresponding IP address is duplicate.

In step S1070, the AP may transmit the result of duplicate address detection to the STA. The STA may receive the result of duplicate address detection result in step S1080.

In step S1090, the STA may determine whether the IP address configured in step S1030 will be continuously used on the basis of the presence or absence of a duplicate address. Otherwise, the STA may determine whether a new IP address will be generated or allocated.

The above-mentioned IP configuration method may be implemented such that above described various embodiments of the present invention may be independently applied or two or more embodiments thereof may be simultaneously applied and a repeated description is omitted for clarity.

Figure 11:
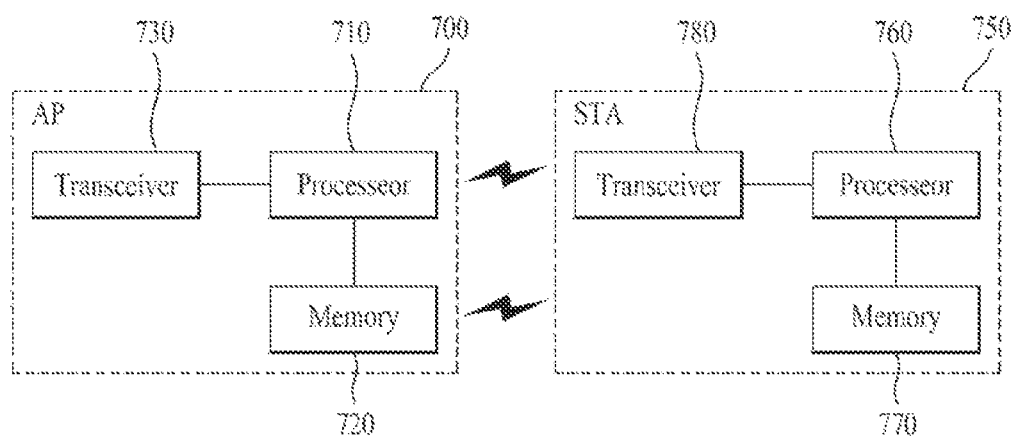
FIG. 11 is a block diagram illustrating a radio frequency (RF) device according to one embodiment of the present invention.

FIG. 11 is a block diagram illustrating a radio frequency (RF) device according to one embodiment of the present invention.

Referring to FIG. 11, an AP 700 may include a processor 710, a memory 720, and a transceiver 730. An STA 750 may include a processor 760, a memory 770, and a transceiver 780.

The transceivers 730 and 780 may transmit/receive radio frequency (RF) signals and may implement a physical layer according to an IEEE 802 system.

The processors 710 and 760 are connected to the transceivers 730 and 760, respectively, and may implement a physical layer and/or a MAC layer according to the IEEE 802 system. The processors 710 and 760 may be configured to perform an IP setup operation, a neighbor discovery operation, etc. before completion of initial link setup according to the above described various embodiments of the present invention.

Modules for implementing operation of the AP and STA according to the above described various embodiments of the present invention are stored in the memories 720 and 770 and may be implemented by the processors 710 and 760. The memories 720 and 770 may be included in the processors 710 and 760 or may be installed at the exterior of the processors 710 and 760 to be connected by a known means to the processors 710 and 760.

The overall configuration of the AP and STA may be implemented such that above described various embodiments of the present invention may be independently applied or two or more embodiments thereof may be simultaneously applied and a repeated description is omitted for clarity.

The above-described embodiments may be implemented by various means, for example, by hardware, firmware, software, or a combination thereof In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Although the above various embodiments of the present invention have been described based on an IEEE 802.11 system, the embodiments may be applied in the same manner to various mobile communication systems.

The invention claimed is:

1. A method for performing Internet Protocol (IP) configuration by a station (STA) of a wireless local area network (WLAN) system, the method comprising:
prior to performing an initial link setup procedure with an access point (AP), receiving, at the STA from the AP, a beacon frame including network information;
performing, by the STA, the initial link setup procedure with the AP, the initial link setup procedure including a discovery procedure, an authentication procedure and an association procedure;
when the AP supports an IP configuration of a higher layer for the STA before completion of the initial link setup procedure between the AP and the STA, performing the IP configuration of the higher layer by the STA during the initial link setup procedure with the AP; and
wherein the IP configuration of the higher layer performed during the initial link setup procedure with the AP comprises:
generating, by the STA, a specific IP address based on the beacon frame including the network information;
transmitting, by the STA to the AP, a request frame including the specific IP address; and
receiving, by the STA from the AP, a response frame indicating whether the STA is allowed to use the specific IP address in the request frame,
wherein a local address for the specific IP address other than an IP prefix by the network information is self-generated by the STA.

2. The method according to claim 1, wherein the response frame further includes an IP address assigned by the AP.

3. The method according to claim 2,
wherein the response frame includes a Medium Access Control (MAC) address,
wherein, if the included MAC address is identical to a MAC address of the STA, the STA uses the specific IP address; and
wherein, if the included MAC address is different from the MAC address of the STA, the STA re-transmits the request frame including a new requested IP address.

4. The method according to claim 1, wherein the request frame is an Access Network Query Protocol (ANQP) request frame, and the response frame is an Access Network Query Protocol (ANQP) response frame.

5. The method according to claim 1, wherein the request frame further includes a MAC address of the STA.

6. The method according to claim 1, further comprising:
determining, by the STA, whether the received network information is different from network information of an IP address owned by the STA.

7. The method according to claim 6, wherein:
the request frame is transmitted only when the received network information is different from the network information of the IP address owned by the STA.

8. The method according to claim 1, wherein the received network information indicates the IP prefix.

9. The method according to claim 1, wherein an IP address is assigned to the STA before completion of initial link setup.

10. The method according to claim 1, wherein the beacon frame includes IP type information indicating an IPv4 type or an IPv6 type.

11. The method according to claim 1, wherein:
the wireless communication network corresponds to an infrastructure network utilizing a dynamic host configuration protocol (DHCP), and
the specific IP address is generated by the STA without using the DHCP.

12. The method according to claim 1, wherein the STA is allowed to use the generated specific IP address, when both of the response frame and the request contain a same IP address as the specific IP address.

13. The method according to claim 1, wherein, when the specific IP address is an IPv6 type, the specific IP address is verified by a duplicate address detection procedure.

14. The method according to claim 1, wherein, if the specific IP address is duplicated with other IP address assignment, the specific IP address is unavailable for the STA.

15. A device for performing Internet Protocol (IP) configuration in a wireless local area network (WLAN) system, comprising:
- a transceiver configured to communicate with an access point (AP);
- a processor configured to control the device including the transceiver,
- wherein the processor is configured to:
  - prior to performing an initial link setup procedure with an access point (AP), receive, from the AP, a beacon frame including network information;
  - perform the initial link setup procedure with the AP, the initial link setup procedure including a discovery procedure, an authentication procedure and an association procedure;
  - when the AP supports an IP configuration of a higher layer for the STA before completion of the initial link setup procedure between the AP and the STA, perform the IP configuration of the higher layer during the initial link setup procedure with the AP; and
- wherein, in performing the IP configuration of the higher layer during the initial link setup procedure with the AP, the processor:
  - generates a specific IP address based on the beacon frame including the network information;
  - transmits, to the AP, a request frame including the specific IP address; and
  - receives, from the AP, a response frame indicating whether the STA is allowed to use the specific IP address in the request frame,
- wherein a local address for the specific IP address other than an IP prefix by the network information is self-generated by the STA.

* * * * *